May 5, 1970         R. A. LOUKS ETAL         3,509,885
COMBINE CHAFFER MATERIAL LEVELER AND AERATOR
Filed March 4, 1968                    4 Sheets-Sheet 1

INVENTORS
ROBERT A. LOUKS
VERNON H. SIETMANN
BY
W. Robert Henderson
ATTORNEY

May 5, 1970 R. A. LOUKS ETAL 3,509,885
COMBINE CHAFFER MATERIAL LEVELER AND AERATOR
Filed March 4, 1968 4 Sheets-Sheet 2
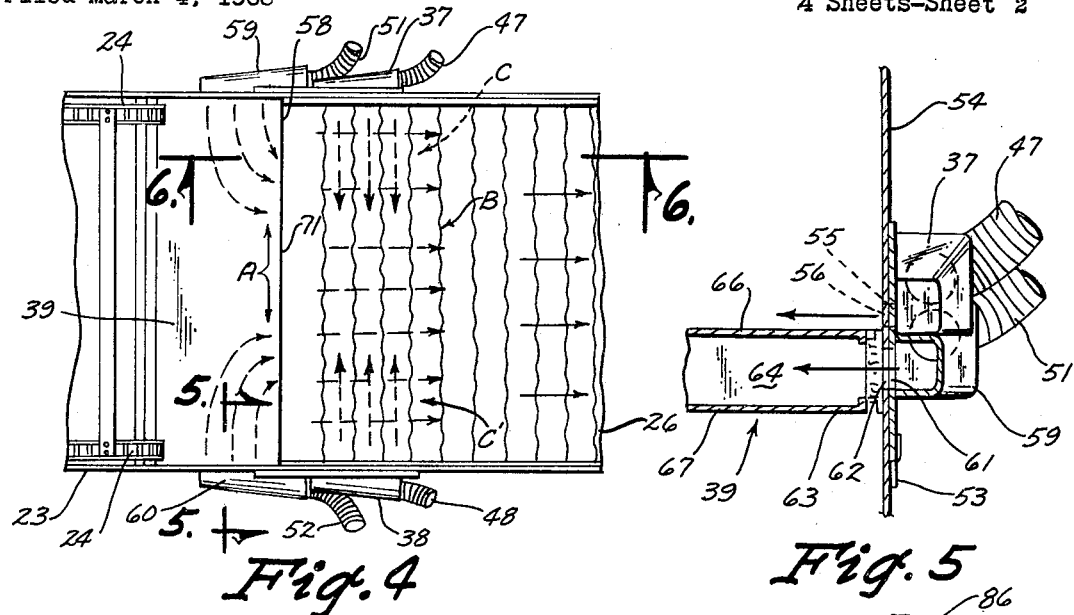
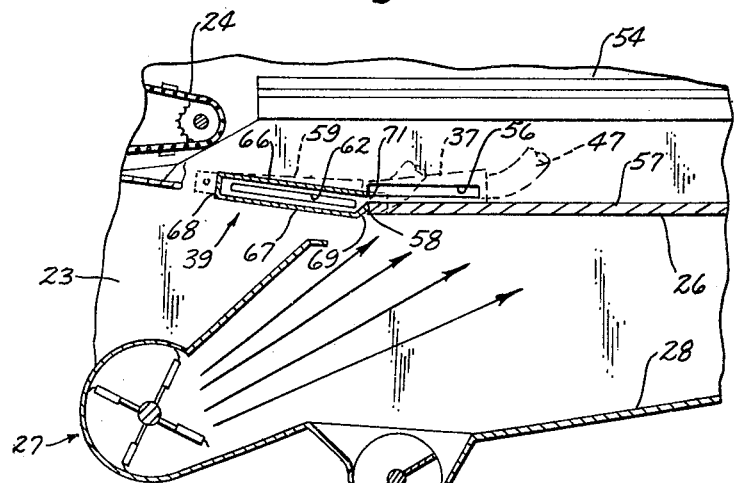
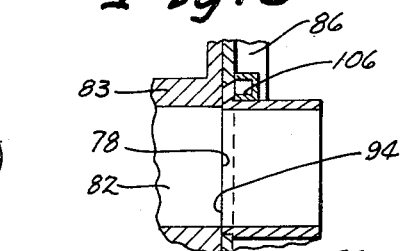
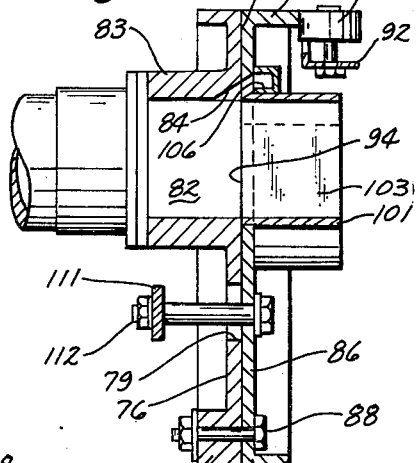
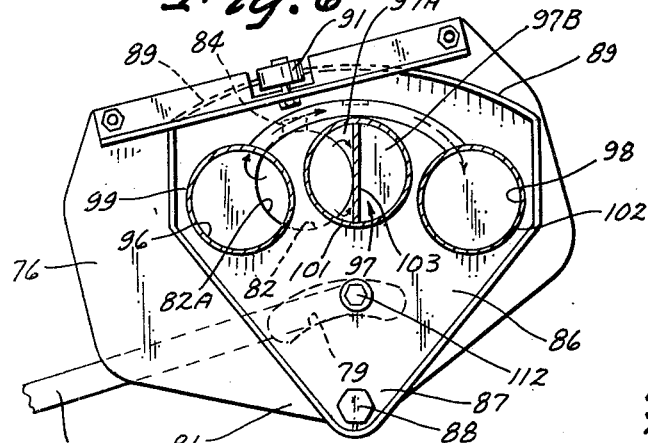
INVENTORS
ROBERT A. LOUKS
VERNON H. SIETMANN
BY
Robert Henderson
ATTORNEY

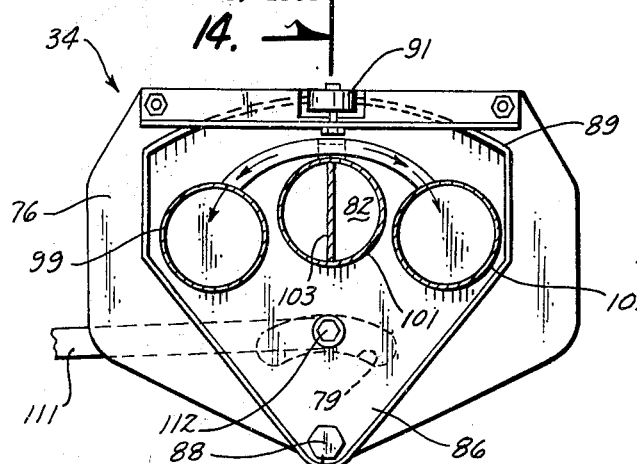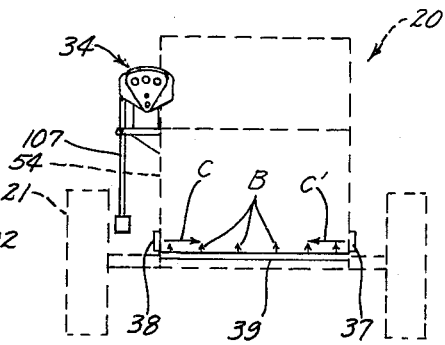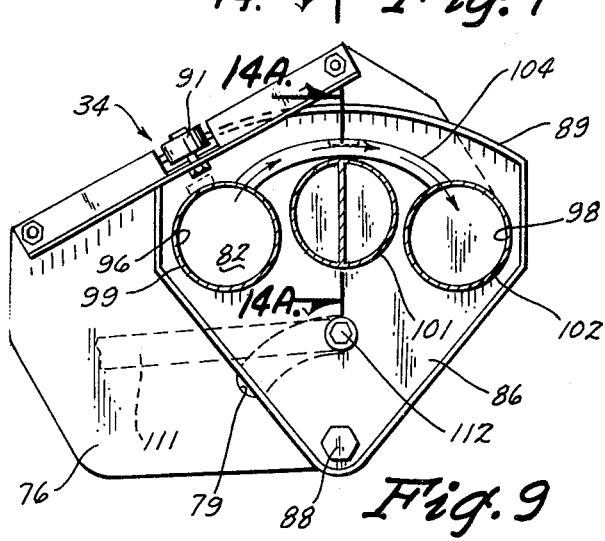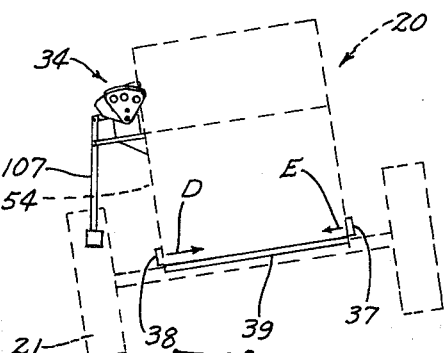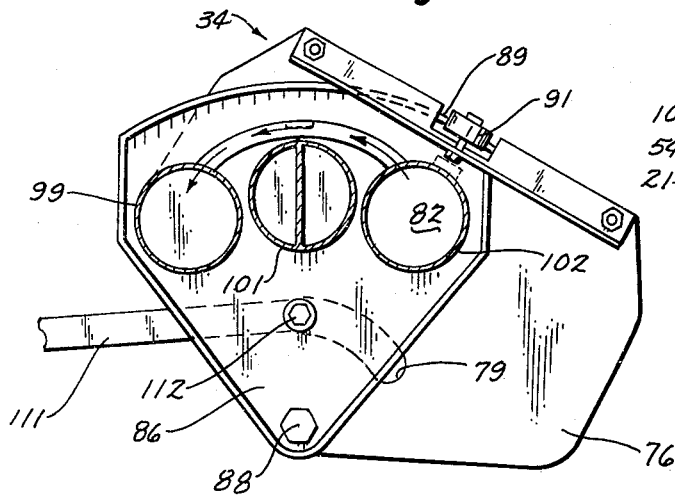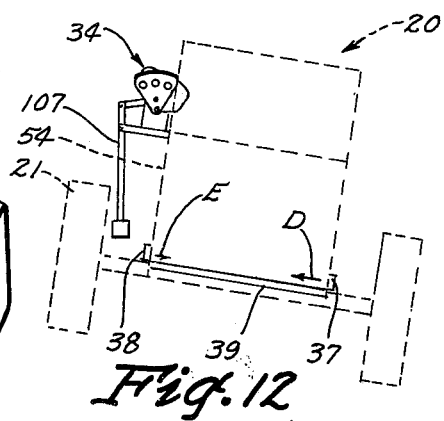
INVENTORS
ROBERT A. LOUKS
VERNON H. SIETMANN
BY
ATTORNEY

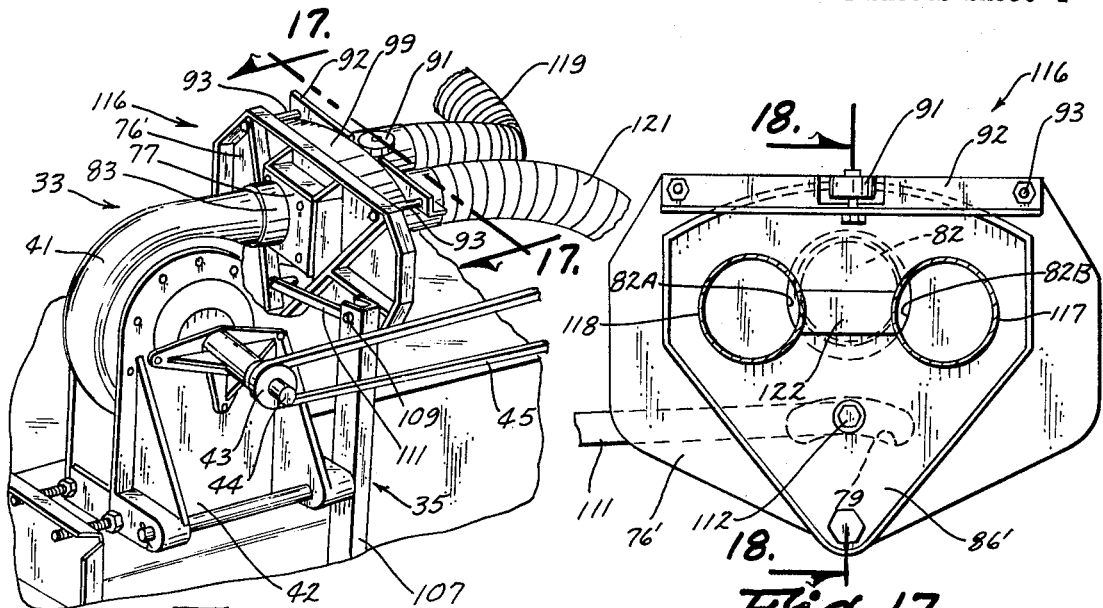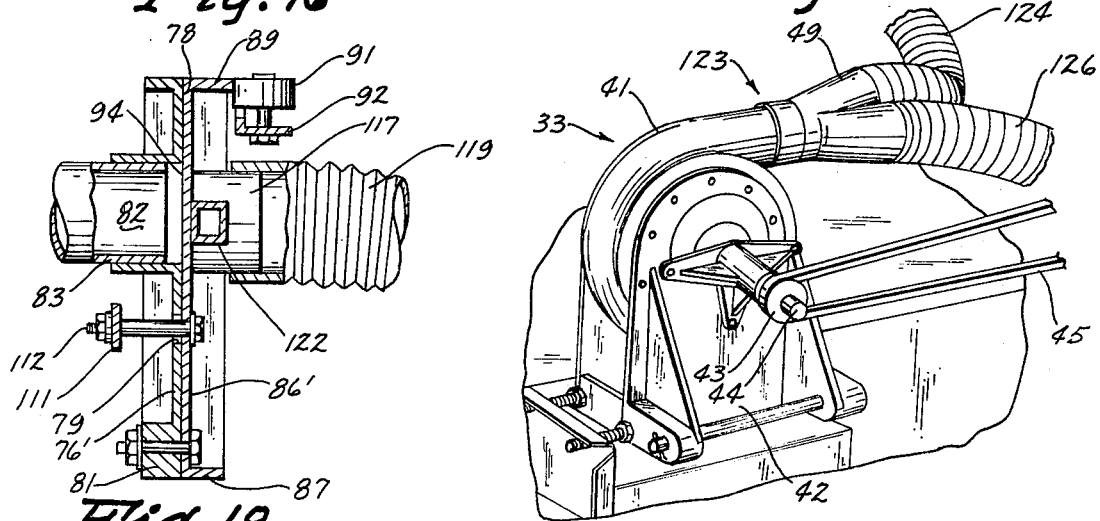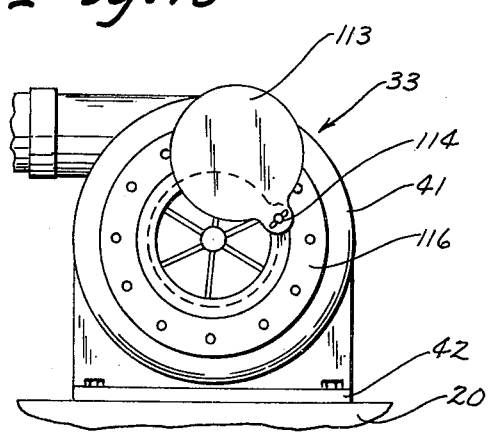

3,509,885
COMBINE CHAFFER MATERIAL LEVELER AND
AERATOR
Robert A. Louks, Gilman, Iowa 50106, and Vernon
H. Sietmann, Laurel, Iowa 50141
Filed Mar. 4, 1968, Ser. No. 710,230
Int. Cl. A01f 7/00
U.S. Cl. 130—27     8 Claims

ABSTRACT OF THE DISCLOSURE

The invention relates to an accessory for a conventional combine which includes a sieve or chaffer area where the grain is delivered for finish cleaning, and comprises a high speed blower that automatically delivers a flow of air under static pressure through a pendulum-operated valve for controller transmission of the air through a plurality of conduits arranged in parallel to manifolds on opposite sides of the chaffer and to a manifold extended transversely across the combine, all manifolds mounted adjacent the front of the chaffer to deliver a majority of air to the downhill side of the chaffer for directing grain to the uphill side, while always maintaining a small amount of air to the uphill side to prevent clogging of the uphill manifold, and to deliver air to the transverse manifold to direct air upwardly and angularly to the substantially horizontal flow of the grain to thereby separate chaff and trash from the heavier grain, effecting an aeration of the material which aids in cleaning.

CROSS REFERENCES TO RELATED APPLICATIONS

Reference is made to the copending applications as to the same subject matter in Ser. No. 514,859 filed Dec. 20, 1965, now Patent No. 3,456,652, issued July 22, 1969, and Ser. No. 595,852 filed Nov. 21, 1966.

BACKGROUND OF THE INVENTION

This invention relates generally to a grain harvester and more particularly to an apparatus for aiding the separation of grain from the straw and chaff.

In recent years, the combine harvester, or harvester-thresher has become the universally accepted machine for harvesting grain crops. A conventional machine of this character comprises a body unit containing threshing and separating apparatus, which carries in front of it a header unit containing grain cutting and conveying apparatus. As the machine is moved through the fields, grain cut by the cutting apparatus is conveyed to the body unit where it is threshed, and where the grain kernels are separated from the straw and chaff.

Conventional grain harvesters include as a part of the separating mechanism horizontally disposed screens or sieves upon which the kernels, chaff, and unthreshed heads are deposited after the straw is separated from them. The screens or sieves are reciprocated rapidly from a fore and aft direction in the path of a rearwardly and upwardly directed stream of air from a fan mounted in the body unit to separate the kernels from the chaff and unthreshed heads. The small, relatively heavy kernels pass through the screens and are collected therebeneath. The light chaff is blown out of the rear end of the body unit. The unthreshed heads, being too large to pass through the screens but too heavy to be blown with the chaff, drop from the rear edges of the screens and are collected for rethreshing.

Further included in conventional grain harvesters is a blower fan mounted beneath the separation and cleaning housing which pulls air in from each end thereof and forces it, through a port or duct, upwardly and through the sieve or screen area. In certain areas of terrain, it has been found that the air pulled in by the blower fan and forced through the screens is so dirty and full of foreign material itself, that the efficiency of the forced air is considerably lowered.

It can readily be seen that for the separation process to be efficient so as to separate all the kernels from the straw and chaff, the grain must be maintained in a level condition on top of at least the uppermost screen. In operation of this type machine over fairly level terrain, the problem is not too serious. One present day method of solving the present problem is by the use of laterally spaced dividers or separators extended longitudinally on top of the screens.

In hilly areas, however, the problem is more serious, losses of from 5–10 bushels of grain an acre being reported, due to the uneven distribution of the grain on the screens. Many solutions of this problem have been suggested, with several being presently used. The great majority of these deal with mechanisms for maintaining the screens themselves level during movement of the combine over the hilly terrain.

In our first copending application, Ser. No. 514,859 filed Dec. 20, 1965 now Patent No. 3,456,652 a partial solution to this problem was disclosed. In that disclosure, the air dispensing manifolds were placed on opposite sides of the chaffer housing in a stationary manner, and with air under pressure, derived from a blower fan auxiliary to the underside blower fan, emitted from the manifolds transversely across the chaffer.

Continuing tests and development of that structure showed several areas of improvement. It was ascertained that certain riddles or screens are reciprocated not only fore and aft, but also slightly upwardly and downwardly. Thus, the fixed manifold housing did not always force a blanket of air directly over the surface of the oscillating screens. Furthermore, material tended to lodge beneath the manifold housings and distort same as the screens oscillated therebeneath.

It was also found that the source of air pressure for the manifolds could be derived from the underside blower fan without impairing the capacity output thereof for cleaning purposes, and that the efficiency of this arrangement was greatly increased by obtaining clean air from near the top of the combine harvester rather than at the far location.

Additionally, the manifolds were located on opposite sides of the raddle or separator unit in the alternative to the riddle manifolds, and it was ascertained that the efficiency and effectiveness of the system in this area was still considerably greater than that known or obtained in other known forced air systems.

As shown in the second copending application, Ser. No. 595,852, distinct improvements were introduced. Manifolds were placed on opposite sides of the riddle or separator unit, and with a noticeable increase of grain and chaff separation efficiency. Manifolds for the riddle or chaffer area were built into that part of the chaffer which shakes to maintain the transverse air flow constant with the surface of the chaffer. All leveling air was derived from near the top of the combine for cleaner air.

Leveling air was emitted from both manifolds at all times, with the greatest amount from the downhill manifold, but with a small but sufficient amount from the uphill manifold to prevent it from becoming clogged during operation. Additionally, a transversely extended plenum chamber was introduced across the front or inner end of the chaffer to receive the air from both manifolds, and to redirect it upwardly and angularly relative to the normally horizontal flow of grain and chaff, whereby to aerate or separate the chaff and trash upwardly and away from the heavier grain.

SUMMARY OF THE INVENTION

In summary, this invention pertains to an apparatus for aiding the separation of grain from all other material therewith passing longitudinally over a chaffer unit in a conventional threshing machine, and which apparatus comprises generally a blower unit mounted on the machine and operable by connection with the machine to force air under pressure through a conduit group to a pair of manifold housings placed on opposite sides of the chaffer unit at its innermost end, and to a plenum chamber that is extended across the inner end of the chaffer, and which manifold housings and plenum have apertures formed therein to enable the air under pressure to be directed simultaneously over the upper surface of the chamber in the form of two blankets of air moving in directions normal to each other.

The air is transmitted from the blower unit to the conduit group through a valve assembly which is controlled in response to the tilt of the combine when on uneven terrain, and which valve assembly causes air to be transmitted to both of the hillside manifolds at all times, but with more air always being directed to the low side manifold than to the high side manifold; and wherein air is also directed in parallel with the hillside manifolds to the plenum chamber aerator for emission therefrom at all times that the combine is on substantially level terrain.

It is an object of this invention to provide an improved combine, particularly in the increased efficiency of the grain cleaning area, wherein more and cleaner grain is provided.

Still another object of this invention is the provision of a single valve assembly wherein air from the blower is forwarded simultaneously to the manifolds on either side of the riddle or chaffer for hillside leveling control, and to a transverse plenum chamber at the front of the chaffer for forcing air upwardly and angularly to the normal flow of grain for separation or aeration purposes, thereby making the grain more clean.

It is another object of this invention to provide such a valve assembly as a part of a manifold system wherein the majority of air from the blower is directed to both the low or downhill side manifold and to the low or downhill side of the transverse aeration chamber, thus utilizing the manifold system to the utmost efficiency.

Yet another object of this invention is to provide such a valve assembly where air under pressure is delivered to the hillside manifolds at all times during operation of the combine, and with air under pressure delivered to an aeration manifold or plenum chamber at all times except when the combine is at its extreme tilted positions to either side.

It is another object of this invention to provide an apparatus operable to maintain the grain on the upper surface of a separator chaffer or riddle in a level condition during reciprocation of the riddle, irrespective of the lateral inclination of the combine.

Another object of this invention is to provide such an apparatus which can be installed initially as an integral part of a new combine, or which can readily be installed after manufacture of the combine, as an accessory item.

Yet another object of this invention is to provide such an apparatus for emitting an opposed pair of blankets of air under pressure in directions initially normal to the flow of the grain over a riddle, which blankets move directly over and parallel to the surface of the riddle.

It is another object of this invention to provide such an apparatus wherein the place and amount of air being directed over a riddle is completely determined by the inclination of the combine relative to a level terrain.

Yet another object of this invention is to provide such an apparatus wherein opposed blankets of air are forced directly over and parallel to the surface of the riddle even when said surface is substantially horizontal.

These objects, and other features and advantages of this invention will become more readily apparent upon reference to the following description when taken in conjunction with the accompanying drawings.

BRIEF DESCRIPTION OF THE DRAWINGS

FIG. 4 is a reduced fragmentary plan view of the structure depicted in FIG. 3;

FIG. 5 is an enlarged sectional view taken along the line 5—5 in FIG. 4;

FIG. 6 is an enlarged, cross-sectional vertical view as taken along the line 6—6 in FIG. 4;

FIGS. 7 and 8 are companion views, FIG. 7 being taken along line 7—7 in FIG. 2 when the combine is on level ground, and FIG. 8 showing in reduced schematic view, from the front of the combine, the pendulum device when the combine is on level ground;

FIGS. 9 and 10 are similar to FIGS. 7 and 8, but showing the combine tilted to one side on a sloping hillside;

FIGS. 11 and 12 are similar to FIGS. 9 and 10, but wherein the combine is tilted on an oppositely sloping hillside;

FIG. 13 shows the valve assembly in cross section, positioned about half-way between the FIGS. 7 and 9 positions, with the combine tilted accordingly;

FIG. 14 is a cross-sectional view as taken along the line 14—14 in FIG. 7;

FIG. 14A is a fragmentary cross-sectional view taken along the line 14A—14A in FIG. 9;

FIG. 15 is a fragmentary view of the side of the blower opposite the FIG. 2 side;

FIG. 16 is a perspective view of the blower and valve arrangement of a modified embodiment;

FIG. 17 is an enlarged sectional view taken along the line 17—17 in FIG. 16;

FIG. 18 is a sectional view taken along the line 18—18 in FIG. 17; and

FIG. 19 is a perspective view similar to FIG. 16 of a second embodiment of a blower and valve arrangement.

DESCRIPTION OF THE PREFERRED EMBODIMENTS

Figure 1:
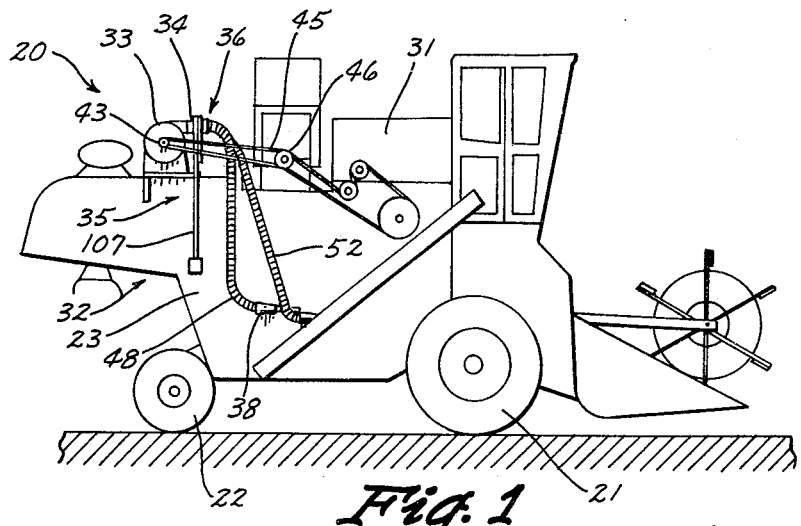
FIG. 1 is a side elevational view of a combine harvester with which the apparatus of this invention is assembled.

Referring to the drawings, the apparatus of this invention of which there are several modifications, is shown attached to a conventional combine indicated generally at 20 in FIG. 1. The combine 20 is mounted on a pair of drive wheels 21 and a pair of rear dolly wheels 13.

The threshing and separating elements of the combine 20 are mounted inside a housing 23, the bottom rear area of which is open. As is well known in the art, after the threshing operation about ninety percent of the grain is passed over a raddle or separator unit 24 (FIG. 3) and thence downwardly to a cleaning mechanism. Grain still remaining in the straw is dislodged by commonly called "straw walkers" (not shown) which are mounted about the cleaning mechanism. Operation of the straw walkers effects a final separation of the grain, whereupon the grain falls downwardly either directly onto the cleaning mechanism or onto a return conveyor for movement to the rear of the mechanism as described more in detail hereinafter.

Figure 3:
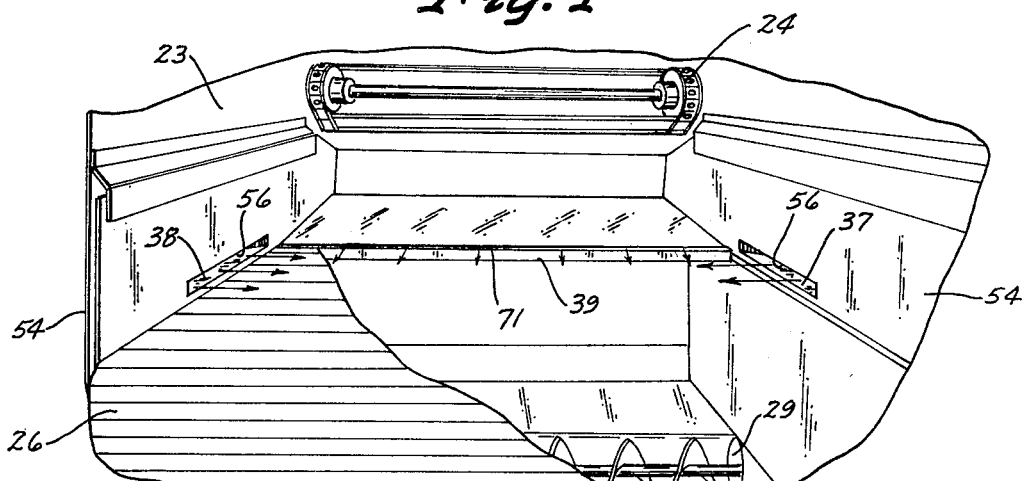
FIG. 3 is an enlarged, fragmentary perspective view of the interior of the chaffer area, looking inwardly from the rear of the combine, with certain parts broken away for clarity of the invention.

The cleaning mechanism itself comprises, in this combine 20, a sieve 26 (FIGS. 3 and 6). The sieve 26 is reciprocated backwards and forwards longitudinally of the housing 23 to agitate, in conjunction with air from a cleaning fan 27 (FIG. 6), the material deposited thereon. Grain kernels deposited on the sieve 26 are permitted to work therethrough and drop onto a collecting pan 28 therebeneath which forms part of the bottom of the housing 23. The pan 28 contains a grain auger 29 which transports the grain transversely of the combine to an elevator (not shown) where it is elevated to a grain tank 31 (FIG. 1) mounted on the combine. Chaff and other foreign material deposited on the sieve 26 is caught in an air stream and blown out through a discharge opening 32 (FIG. 1) formed at the rear of the combine housing 23.

Figure 2:
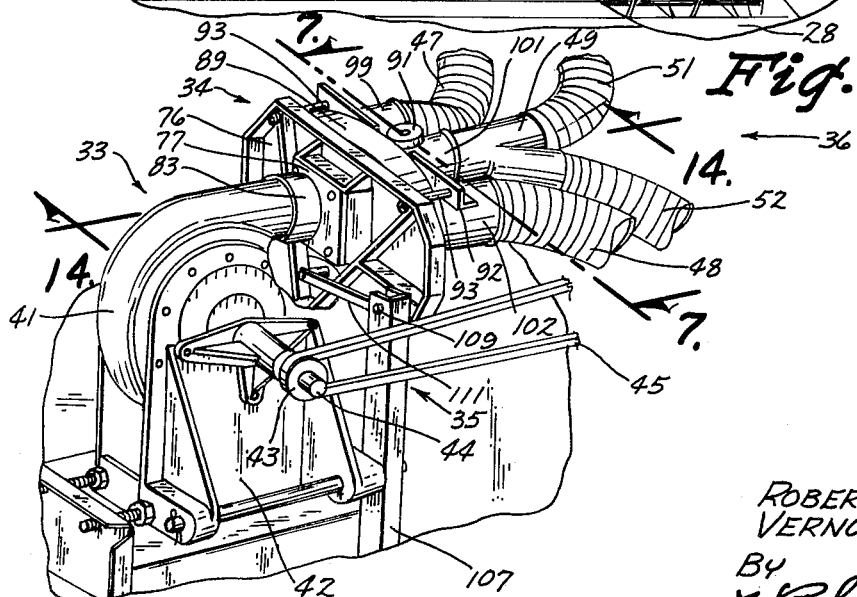
FIG. 2 is an enlarged, fragmentary view of the blower and valve assembly of the apparatus.

The first embodiment of this invention is illustrated in FIGS. 1–15 inclusive, and comprises generally an air blower unit 33 (FIG. 2), a valve assembly 34 connected to the air blower unit for receiving air therefrom, a control assembly 35 for controlling the operation of the valve assembly 34, a conduit group indicated generally at 36 in FIG. 2 for distributing the air from the blower unit as determined by operation of the valve assembly 34, a pair of hillside manifolds 37 and 38 (FIG. 4), and an aerator housing 39 (FIGS. 4 and 6).

The air blower unit 33 (FIG. 2) comprises a blower fan 41 which has a predetermined static air pressure rating, and which is mounted by means of a bracket 42 onto an upper surface of the combine housing 23. A pulley 43 is mounted on the exposed end of the drive shaft 44 for the fan 41, and by means of a belt 45 operated off a conventional pulley 46 (FIG. 1) of the combine, drive is imparted to the blower fan 41.

The valve assembly 34 and the valve control assembly 35 will be described more in detail hereinafter. Suffice it to say at this stage that these units operate to control the amount of air transmitted from the blower fan 41 to the conduit group 36, and also operate to control which of the conduits receive air, and how much air is received by the respective conduits.

The conduit group 36 comprises a pair of outer, hillside, flexible conduits 47 and 48 (FIGS. 2 and 4), and a Y-housing 49 for connecting the valve assembly 34 to a pair of inner, aerator, flexible conduits 51 and 52 (FIGS. 2 and 4). The two hillside conduits 47 and 48 lead respectively to the pair of hillside manifolds 37 and 38 (FIGS. 4 and 5), which manifolds 37 and 38 are identical, being of a mirror-type such that they are adapted for right and left mounting in facing directions on opposite sides of the housing 23. Referring specifically to FIG. 5, the hillside manifold 38 is shown in elevation, and as they are identical, only one will be described.

The housing 38 comprises an air tight, substantially box-shaped housing integral with a flat plate 53 for securement to the exterior wall 54 (FIG. 5) of the combine housing 23. An elongated slot 55 (FIG. 5) is formed in the plate 53 and registers with another elongated slot 56 formed in the sidewall 54 of the housing 23 for transmitting air from the flexible conduit 48 into the interior of the housing 23.

Referring to FIGS. 3 and 6, it will be noted that the inner slot 56 extends parallel to and slightly above the upper surface 57 of the sieve 26, with the rear end 56' of the slot 56 disposed substantially directly above and even with the rear end 58 of the sieve 26. By this arrangement, upon air being received in both manifolds 37 and 38, the air is transmitted and discharged through the slots 56 in the form of a blanket of air under pressure, which air is forced laterally inwardly of the manifolds 37 and 38 toward the center of the housing 23. This action insures a continual cleaning of the chaff and granular material being passed onto the sieve 26 at its rear end 58 (FIG. 6).

The aerator conduits 51 and 52 (FIG. 2) also lead to a pair of manifold housings 59 and 60 (FIG. 4) which are substantially identical to the manifolds 37 and 38 and which also are affixed to the sidewalls 54 of the housing 23. Referring to FIG. 5, it is seen that a pair of slots and 62 are formed, respectively, in the plate of a manifold housing 59, and in the wall 54 for transmitting air from the housing 59 into the outer end 63 of the aerator housing 39 as shown by the lower arrow in FIG. 5.

The aerator housing 39 forms a plenum chamber 64 (FIG. 5) by means of a substantially flat upper wall 66 (FIG. 6), a lower wall 67 extended parallel thereto, a rear wall 68, and a front wall 69 which forms an aperture 71 which extends completely across the entire length of the aerator housing 39 as best illustrated in FIG. 6. It is noted that the aerator housing aperture 71 is substantially even with the rear end 58 of the sieve 26, and is slightly above the upper surface 57 of the sieve such that upon air entering the plenum chamber 64 of the aerator housing 39, the air is forced outwardly of the housing in a jet-like manner with the forced air taking a general direction the portions of which are substantially parallel to the surface 57 of the sieve 26, with other portions being projected angularly upwardly and away from the aperture 71 toward the rear of the housing 23.

Referring to FIG. 4, curved arrows indicated generally at A show air entering the plenum chamber 64 of the aerator housing 39, with straight, rearwardly extended arrows indicated generally at B showing the general direction of the air after it has left the aerator housing 39 and as it moves rearwardly over the sieve 26, both parallel and angular thereto. The dotted line arrows C and C' represent the direction of the air as it leaves the hillside manifolds 37 and 38 under all operating conditions of the combine 20. Under certain circumstances as explained more in detail hereinafter, air is cut off from entering the aerator housing 39, but in all instances of the combine 20 being on level terrain, the air under static pressure is emitted from the aerator housing 39 ase indicated in FIG. 4.

The valve assembly 34 comprises basically a generally rectangular stationary plate 76 (FIGS. 2 and 14) which is secured in an upstanding manner by a bracket 77 affixed to the blower fan 41, with the smooth face 78 (FIG. 14) of the stationary plate (hereinafter termed "plate") facing the front of the combine 20. An arcuate slot 79 is formed in the lower portion of the plate 76, the imaginary center of which is the lower apex portion 81 of the plate.

Centrally of the plate is formed a large bore or first passage 82 within a collar 83 of the bracket 77, and directly above the first passage 82, and forming a keyhole therewith is a short second passage 84 (FIGS. 13 and 14) having an angular slope to its upper wall surface as viewed in vertical cross-section in FIG. 14. The first passage 82 receives air from the fan 41 for transmission trough the movable valve plate 86 (hereinafter termed "valve") of the valve assembly 34.

The valve 86 is somewhat triangular in elevation and is pivotally connected at its own apex portion 87 by means of a pivot bolt 88 to the apex 81 of the plate 76. The upper part 89 of the valve 86 is rounded in a semicircular manner, and is engaged at its center by a roller 91 pivotally mounted on an L-shaped plate 92 held forwardly of and spaced from the plate 76 by a pair of long bolts 93 (see FIG. 2). By this arrangement, the valve 86 is also held in an upstanding condition, with its smooth face 94 (FIG. 14) in a frictional, but movable fluid-tight sealing engagement with the plate face 78.

The valve 86 has a trio of openings 96, 97 and 98 (FIG. 13) formed therein which are in registration with collars 99, 101 and 102, the latter being respectively fluid coupled with the hillside conduits 47 and 48, and with the aerator conduit housing 49 as illustarted in FIG. 2. It will be noted, referring to FIG. 13, that the valve collar 101 has a vertical divider 103, dividing the center opening 97 in two sections 97A and 97B, the import of which will be seen hereinafter.

It will also be noted that each opening 96–98 and collar 99–102 have a diameter substantially identical to the diameter of the first passage 82, and that the arcuate spacing from center-to-center of the openings 96–98 is such that when the combine 20 has tilted on a hillside such as to place the first passage 82 halfway between a pair of openings, 96 and 97 for example as seen in FIG. 13, equal portions 82A and 82B of the passage 82 fall within the openings 96 and 97 such that air flowing through the passage 82 will be passed equally into the two adjacent openings 96 and 97.

To insure that air under static pressure is transmitted from the fan 41 to both hillside conduits 47 and 48 at all times, a curved bypass member 104 is formed in an integral manner with the valve 86 (FIGS. 13 and 14), with the outer ends of the bypass 104 open to the openings 96 and 98 for the two collars 99 and 102 to which the conduits 47 and 48 are attached. A small aperture 106 of approximately the same size as the passage 84 (FIG. 14) is formed in the face 94 of the valve 86 for registering the aperture 106 with the second passage 84 when the plate 76 and the valve 86 are in their centered positions as best illustrated in FIG. 7: By this arrangement, and when the plate 76 and valve 86 are in their FIG. 7 position, air from the first passage 82 enters the center opening 97 and its collar 101 for transmission through the Y-housing 49 to the aerator conduits 51 and 52, and simultaneously air is transmitted from the first passage 82 through the second passage 84 and the aperture 86 into the bypass 104 for distribution, as indicated by the arrows in FIG. 7, into both openings 96 and 98, and their collars 99 and 102 for transmission through the hillside conduits 47 and 48 to the manifolds 37 and 38.

Referring to FIG. 14A, which shows a section of the plate 76 and valve 86 when these members are either in the FIG. 9 position, or are in the FIG. 11 position, it will be noted that the bypass 104 is shut off from the first passage 82 such that no air is transmitted therebetween. In these arrangements, as best illustrated in FIG. 13, so long as any portion of the passage 82, such as the portion 82A, falls within an opening, such as the opening 96 and its collar 99, air entering that collar 99 from the passage portion 82A has a portion thereof bypassed through the bypass 104 to the other collar 102 such that under this relative position of the plate 76 and the valve 86, air is still transmitted through both hillside conduits 47 and 48.

The control assembly 35 for effecting and maintaining a proper relationship between the plate 76 and the valve 86 in all positions of the combine 20 for controlling the transmission of air into the conduit group 36 (FIG. 2) comprises an elongated pendulum 107 (FIGS. 1 and 2) which is pivoted intermediate its ends at 109 to the bracket 42, and which is pivotally connected at its upper end to a link 111. The link 111 is pivotally connected at its inner end to one end of a bolt 112 (FIG. 14) which is inserted through the slot 79 formed in the plate 76 for securement to the valve 86.

By this arrangement, when the combine 20 tilts either way from a perfectly level position, the pendulum 107 acts to retain the valve 86 in a constant, upright condition as best illustrated in FIGS. 7, 9 and 11.

In operation of the combine hillside and aeration structure, the relative positions of the stationary plate 76 of the valve assembly 34 and the movable valve 86 thereof are shown in FIG. 7, and FIG. 8 shows in schematic the combine 20 as it would appear when on level terrain. The center opening collar 101 is aligned and registered with the bore 82 of the plate 76, and referring to FIG. 14 it is seen that the passage 84 and aperture 106 are also in registration. Therefore, upon operation of the blower fan 41, air under static pressure is transmitted through the bore 82 and into both the opening collar 101 and the bypass 104 wherein the air is transmitted through all four conduits 47, 48, 51 and 52 into the two hillside manifolds 37 and 38 (FIG. 4) and the transverse aerator housing 39. Air under static pressure is then emitted from the manifolds and the housing as illustrated by the arrows A, B, C and C' and as described hereinbefore. Referring to FIG. 8, the air currents are again indicated by the letters B, C and C', and it is noted that the magnitude of the air designated C and C' is substantially the same.

Thus, in the relative condition of the plate 76 and the valve 86 of the valve assembly 34 as depicted in FIG. 7, when the combine 20 is on perfectly level terrain, equal amounts of air under static pressure are discharged in blankets of air as described hereinbefore toward each other across the innermost end 58 of the sieve 26 for maintaining the grain and other material passing thereacross in a level condition. Additionally, air is emitted from the aerator housing 39 in equal amounts across its entire width for aeration purposes in further separating the grain from the chaff and other foreign material as it is being dumped onto the inner or rear end 58 of the sieve 26 from the raddle unit 24 (FIG. 6).

Referring to FIGS. 9 and 10, the condition of the combine 20 is shown tilted to the left such as to effect an outward movement of the pendulum 107 away from the sidewall 54 of the combine 20 such that the plate 76 and valve 86 assume the relationship as best illustrated in FIG. 9.

In this relationship, the leftmost opening collar 99 is aligned and registered with the bore 82 such that air passing therethrough is transmitted in the main through the conduit 48 to the hillside manifold 38 as illustrated in FIG. 10. A smaller portion of the air being transmitted into the opening collar 99 is bypassed by means of the bypass 104 over to the opening collar 102 for further transmission by the conduit 47 to the other hillside manifold 37. Thus in this extreme tilted condition of the combine 20, the greatest amount of air under static pressure is emitted from the manifold 38 across the sieve 26 as illustrated by the arrow designated D, whereas a smaller portion of the air from the fan 41 is emitted from the manifold 37, as indicated by the arrow E. It is to be noted, that as all connection between the bore 82 and the center opening collar 101 is cut off, as illustrated in FIG. 14A, no air is being transmitted to the aerator housing 39.

Referring to FIG. 13, as was described hereinbefore, should the combine 20 be not tilted in the extreme condition as shown in FIG. 9, where a portion 82B of the bore 82 is in registration with the center collar 101, air not only is transmitted through both hillside conduits 47 and 48 as described hereinbefore, but also air under static pressure is transmitted into the Y-housing 49. It will be noted that as the bore portion 82B registers only with the left side 97A of the center opening 97, as viewed in FIG. 13, due to the divider 103 being present, air under static pressure is transmitted only through the conduit 52 to the manifold 60 (FIG. 4) for the aerator housing 39 such that the air flow indicated generally by C' in FIG. 4 is emitted rearwardly from the aerator housing 39, with hardly any air being emitted from the opposite side of the aerator housing due to the lack of air being passed through the conduit 51 to the aerator housing manifold 59. There may be certain conditions where the aerator housing 39 itself would be divided laterally into two separate chambers as is the center collar 101 such that air entering the aerator housing 39 from either manifold 59 or 60 is not passed to the opposite side of the aerator housing 39.

Referring to FIGS. 11 and 12, the opposite relation of the valve 86 and plate 76 are illustrated as compared to the arrangement of FIGS. 9 and 10, and again with the majority of the air under static pressure being emitted from the hillside manifold 37, as indicated by the arrow D, and with the minority of the air emitted from the hillside manifold 38, as illustrated by the arrow E. The arrows D and E in FIG. 12 are representative of the same amount of air flow as indicated by the arrows D and E in FIG. 10.

Referring to FIG. 15, the inner side of the blower fan 41 is illustrated, and with an air intake door 113 being pivotally connected at 114 to the blower housing 116. The amount of air that is supplied to the shoe or sieve 26 area by the blower fan 41 can be regulated by opening or closing the air intake door 113, which movement of the door 113 is manually accomplished.

Referring to FIGS. 16 through 18 inclusive, a first modification of the valve assembly 34 is illustrated, this valve assembly being indicated generally at 116. Like parts of the modified valve assembly 116 are indicated by like reference numerals.

The stationary plate 76' is formed with substantially the same shape as the original plate 76, but without the passage 84.

The movable valve 86' also has substantially the same outline as the valve 86, but instead of a trio of openings has but a pair of openings formed therein with collars designated at 117 and 118 (FIG. 17). A pair of flexible conduits 119 and 121 are attached, respectively, to the collars 117 and 118, which conduits are connected at their far ends to the two hillside manifolds 37 and 38 as illustrated for the original embodiment in FIG. 4.

Each collar 117 and 118, as best illustrated in FIG. 17, is slightly smaller in diameter than the bore 82 of the plate 76', such that when the combine 20 is on perfectly level terrain, and the plate 76' and the valve 86' are arranged in their normal, level position due to operation of the valve control assembly 35, as depicted in FIG. 17, small portions 82A and 82B of the bore 82 register with the opening collars 117 and 118 such that air under static pressure is being transmitted through the conduits 119 and 121 to the hillside manifolds 37 and 38 at all times, even when the combine 20 is in the level position as shown in FIG. 8.

Should the combine 20 be tilted to either the left as shown in FIG. 10, or to the right as shown in FIG. 12, where the plate 76' moves to the left or to the right as related to the valve 86', as is shown for the original valve and plate arrangement FIGS. 9 and 11, it will be noted that the bore 82 loses its registration with one of the opening collars 117 and 118.

Again, as was the case with the outermost opening collars 99 and 102 of the original valve assembly 34, a bypass 122 (FIGS. 17 and 18) is provided which maintains both collars 117 and 118 in fluid communication at all times. Thus, when the combine 20 is tilted to one side, a majority of the air under static pressure from the fan 41 is transmitted to the low side of the sieve 26 and emitted from that manifold such as to force a blanket of air upwardly over the sieve tending to level out the grain as it is being passed thereover from the raddle unit 24.

At the same time, there will always be a small amount of air under pressure coming from the high side manifold to prevent chaff and other foreign material from being blown into the high side manifold and possibly plugging it up. A certain amount of air under a positive pressure is therefore always emanating from both hillside manifolds 37 and 38 from the modified valve assembly 116 for transmission across the sieve at the inner end 58 thereof for maintaining the grain in a level condition irrespective of the titled condition of the combine 20.

Referring to FIG. 19, still another modified arrangement is shown as compared to that illustrated in FIGS. 1–15, and in FIGS. 16–18. All elements identical to elements of the other modifications are indicated by like reference numerals.

The second modification, indicated generally at 123 comprises the blower fan 41 adapted to force air directly into the Y-housing 59 for transmission through conduits 124 and 126 to the aerator housing 39 manifolds 59 and 60 (FIG. 4).

This embodiment 123 would be adaptable for use in conjunction with a combine 20 where the hillside structure was not needed, but wherein the benefit of the aeration from the aerator housing 39 (FIGS. 3 and 4) was desired. As the hillside structure is eliminated from the second modification 123, naturally the movable valve structure, and the valve control assembly 35 is unnecessary as to this embodiment 123. As long as the blower fan 41 was operating, air under static pressure would be emitted in equal proportions to both sides of the aerator housing 39 for aeration through the aperture 71 (FIG. 6) over the inner end 58 of the sieve 26 as best illustrated by the arrow C and C' in FIG. 4.

Although a preferred embodiment and two modifications thereof of this invention have been described hereinbefore, it is to be remembered that other modifications may be made thereto without departing from the true spirit and scope of the invention as defined in the appended claims.

We claim:

1. In a threshing machine mounted on a wheeled frame, having a rotatable element, and having a housing within which a chaffer unit is conventionally mounted, apparatus for aiding the separation of grain from the material passing longitudinally over the chaffer unit, said apparatus comprising:

blower means mounted on the machine and operable by the rotatable element to pull in air from the atmosphere;

conduit means connected to said blower means for receiving and transmitting air under pressure therefrom;

manifold means mounted on opposite sides of the chaffer unit at the inner end thereof within the housing and connected to the other end of said conduit means, said manifold means including a pair of manifold housings each having a slot formed therein extended substantially parallel to and slightly above the surface of the chaffer unit;

plenum chamber means mounted within the housing and extended transversely across the chaffer unit at the inner end thereof and connected to the other end of said conduit means, said chamber means including a chamber housing having a slot formed therein extended substantially the full width of the chaffer unit, said slot substantially on a level with the surface of the chaffer unit;

valve means interposed in said conduit means for controlling the flow of air therethrough; and control means mounted on the machine and connected to said valve means, said control means responsive to lateral inclination of the machine and operable to control said valve means in response to the said lateral inclination.

2. In a threshing machine, apparatus as defined in claim 1, and wherein said valve means includes a stationary plate securely mounted on the machine and having a passage formed therein in fluid communication with said blower means, and a movable plate pivotally mounted on the machine for transverse movement relative to said stationary plate, said movable plate having a trio of transversely spaced openings formed therein, and said movable plate movable to register any one of said openings with said passage, and said openings being in fluid communication with said conduit means.

3. In a threshing machine, apparatus as defined in claim 2, and wherein said valve means includes a fluid bypass chamber fluidly interconnecting the outermost pair of said openings, wherein a portion of the fluid transferred into one outermost opening through said passage is bypassed to said opposite outermost opening.

4. In a threshing machine, apparatus as defined in claim 3, and wherein said stationary plate has a passage formed therein in fluid communication with said bore, said passage having a width less than the width of said bore, and wherein said movable plate has an aperture formed therein centrally of said chamber and in fluid communication therewith, said aperture having a width substantially the same as said passage and registrable therewith.

5. In a threshing machine, apparatus as defined in claim 4, and wherein said openings are spaced apart a distance less than the width of said bore.

6. In a threshing machine, apparatus as defined in claim 1, and wherein said conduit means includes a pair of separate conduits each leading from an outside opening to one of said manifold housings.

7. In a threshing machine, apparatus as defined in claim 6, and wherein said conduit means includes a Y-shaped connection, the single end fluid connecting said center opening of said movable plate to a pair of conduits each of which leads to an opposite end of said plenum chamber for transmitting air into both ends thereof.

8. In a threshing machine, apparatus as defined in claim 7, and wherein said Y-shaped connection is divided longitudinally into two separate chambers, with the inner end of each chamber being approximately half the cross-sectional area of said bore.

References Cited

UNITED STATES PATENTS

| | | | |
|---|---|---|---|
| 2,611,487 | 9/1952 | Stevenson | 130—27.18 |
| 2,694,493 | 11/1954 | Odegarden | 130—27.18 |
| 2,750,037 | 6/1956 | Taylor | 130—27.18 |
| 3,456,652 | 7/1969 | Louks et al. | 130—27.18 |

ANTONIO F. GUIDA, Primary Examiner